United States Patent [19]

Tooyama et al.

[11] Patent Number: 5,135,969
[45] Date of Patent: Aug. 4, 1992

[54] COMPOSITION FOR CATIONIC ELECTRODEPOSITION COATING

[75] Inventors: Minoru Tooyama, Osaka; Akitoshi Shirasaka, Hyogo, both of Japan

[73] Assignee: Shinto Paint Co., Ltd., Amagasaki, Japan

[21] Appl. No.: 468,667

[22] Filed: Jan. 23, 1990

[30] Foreign Application Priority Data

Feb. 3, 1989 [JP] Japan .................................. 1-26488

[51] Int. Cl.$^5$ .................... C08K 3/20; C08L 63/02; C08L 63/04; C08L 63/10
[52] U.S. Cl. .................................. 523/404; 523/414; 523/415; 525/108; 525/113
[58] Field of Search ................. 523/404, 414, 415; 525/108, 113

[56] References Cited

U.S. PATENT DOCUMENTS

| | | | |
|---|---|---|---|
| 4,231,907 | 11/1980 | Tsou | 523/402 |
| 4,356,278 | 10/1982 | Daimer et al. | 523/414 |
| 4,373,054 | 2/1983 | Gibson et al. | 523/501 |
| 4,442,247 | 4/1984 | Ishikura | 523/104 |
| 4,442,248 | 4/1984 | Kanda et al. | 524/507 |
| 4,461,870 | 7/1984 | Kanda et al. | 524/507 |
| 4,496,672 | 1/1985 | Batzill | 523/104 |
| 4,579,886 | 4/1986 | Otsuki | 523/404 |
| 4,732,950 | 3/1988 | Nagai | 523/404 |
| 4,777,199 | 10/1988 | Ishii et al. | 525/123 |
| 4,777,213 | 10/1988 | Kanda et al. | 524/507 |
| 4,788,246 | 11/1988 | Tsuchiya | 523/404 |
| 4,820,777 | 4/1989 | Kanda et al. | 525/293 |
| 4,869,796 | 9/1989 | Kanda et al. | 523/412 |
| 4,975,475 | 12/1990 | Tsuchiya et al. | 523/411 |

Primary Examiner—Melvyn I. Marquis
Assistant Examiner—Christopher P. Rogers
Attorney, Agent, or Firm—Nikaido, Marmelstein, Murray & Oram

[57] ABSTRACT

A composition suitable for use as a coating composition depositable by cationic electrodeposition which has improved edge protection capability containing, in addition to the conventional ingredients used in compositions for cationic electrocoat, such as an aqueous cationic resin, micro-resin particles of a size sufficient to be water dispersible which particles comprise an internally crosslinked polymer of (A) an active hydrogen containing monomer and (B) a monomer containing at least two active double bonds, which polymer further contains a cationic group in sufficient proportion to allow the micro-resin particle to be water dispersed.

7 Claims, No Drawings

COMPOSITION FOR CATIONIC ELECTRODEPOSITION COATING

The present invention relates to a composition for cationic electrodeposition coating which is superior in preventing the edge portion of articles to be coated thereby from corrosion (hereinafter referred to as edge-corrosion prevention).

Cationic electrodeposition coating is a process for coating a cathode article to be coated by passing direct current through a cationic water dispersion prepared by neutralizing a resin having basic groups with an organic acid and diluting with water, this process being widely used in industry at present. Various compositions for cationic electrodeposition coating are therefore being devised.

However, the conventional compositions do not satisfy the recent requirements for the prevention of automobile corrosion, that is, requirements for a high-level of edge-covering performance alternatively referred to as edge-corrosion preventive performance). Where articles have been coated by cationically electro-depositing thereon a film having a thickness of 15 to 25$\mu$, in order to improve their corrosion on resistance, the thickness of a film formed on the edge of this article is only 0 to 3$\mu$ (this film thickness is affected by the edge angle). As a result, corrosion begins from the edge earlier than from other portions, and the retention of corrosion resistance of the coated articles as a whole becomes a problem. The fact is, therefore, that labor-intensive measures, other than cationic electrodeposition coating must be employed, for example, the edge is bent inwards at the time of cutting in order to compensate for the lack of edge coating, or areas which are not readily accessible are processed before electrodeposition coating the article is additionally coated with other materials after cationic electrodeposition coating.

The present inventors have made an intensive study on an improvement in the edge-corrosion preventive power of cationic electrodeposition paints, and as a result, have found that, by adding a water dispersion, of an internally inner-crosslinked polymer, synthesized from an active hydrogen-containing compound and an active double bond-containing containing compound in the form of micro-resin particles of 0.05 to 3$\mu$ in particle size, to the hitherto known cationic electrodeposition paints, excellent edge-corrosion resistance is obtained with the same appearance and corrosion resistance as ever being maintained. The present inventors thus completed the present invention.

The present invention therefore provides a composition for cationic electrodeposition coating characterized in that said composition contains a water dispersion of (I) a resin cationic having groups pendant therefrom; and (II) micro-resin particles comprising an internally crosslinked addition polymer of an active hydrogen-containing compound (A) with an active double bond-containing compound (B) and having cationic groups wherein the resins (I) and (II) are different.

The cationic aqueous resin (I) of the present invention may be any of the conventionally known ones. For example, there are mentioned amino group-containing resins such as amine-modified epoxy resins [Japanese Patent Publication No. 4978/1979, Japanese Patent Kokai (Laid-open) No. 93024/1979, Japanese Patent Publication No. 47143/1978, Japanese Patent Kokai (Laid-open) Nos. 8673/1978, 80436/1980 and 206442/1984], amine-modified polyurethanepolyol resins [Japanese Patent Kokai (Laid-open) Nos. 15449/1979 and 115476/1980] and amine-modified polybutadiene resins [Japanese Patent Kokai (Laid-open) Nos. 16048/1978, 142444/1978 and 90273/1985], sulfonium group-containing resins, phosphonium group-containing resins, etc.

The foregoing cationic aqueous resin (I) is made water-dispersible or water-soluble before use by neutralizing it with an acid. The acid usable may be any of mineral acids and organic acids, and for example it includes nitric acid, lactic acid, formic acid, acetic acid, propionic acid, butyric acid, hydrochloric acid, phosphoric acid and sulfuric acid.

The aqueous coating composition is a dispersion consisting mainly of water, but it may contain solvents other than water such as hydrocarbons, alcohols, esters, ethers and ketones. The amount of these solvents is not important, but it is 0.1 to 40 wt. %, preferably 0.5 to 25 wt. % based on the solid resin.

In producing the composition for cationic electrodeposition coating of the present invention, the cationic aqueous resin (I) may be blended, if necessary, with the known curing agents such as melamine resins, blocked polyisocyanate compounds and trans-esterification curing agents.

To the composition for cationic electrodeposition coating of the present invention may be added a curing catalyst. Such a curing catalyst includes the organic acid salts of cobalt, manganese, iron, zinc, lead, calcium and zirconium, manganese dioxide and organotin compounds. The foregoing organic acid salts and manganese dioxide are used as a curing catalyst for oxidation polymerization, and the organotin compounds such as dibutyltin oxide, dibutyltin laurate, etc. are used as a catalyst for decomposing blocked isocyanate.

The amount of the curing catalyst added is 0.005 to 2.0 wt. %, preferably 0.05 to 1.0 wt. %, calculated as metal, of the solid resin.

To the composition for cationic electrodeposition coating of the present invention may further be added pigments such as extender pigments (e.g. aluminum silicate, precipitated barium sulfate, kaolin, precipitated calcium carbonate), color pigments e.g. titanium oxide, carbon black, zinc white, iron oxide, manganese dioxide) and anti-corrosive pigments (e.g. strontium chromate, lead chromate, basic lead silicate, aluminum phosphomolybdate). These pigments, however, are not limitative.

To the composition for cationic eletrodeposition coating of the present invention may further be added other additives. Specific examples of the additives include surface active agents, organic solvents (e.g. alcohols, ketones, ethers), flow-controlling agents, ultraviolet ray absorbers, etc.

The composition for cationic electrodeposition coating of the present invention may be applied by conventional coating methods such as dip coating, spray coating, etc., but electrodeposition coating is preferred. Electrodeposition coating conditions for the composition of the present invention resembles the commonly used ones. Applied voltage may be varied over a wide range. It may be as low as, for example, 1 volt, but typically, it is in a range of 50 to 500 volts. Current density is usually 1.0 to 15 ampere/feet$^2$, but it decreases during electrodeposition coating, which means that an insulating film is formed during electrodeposition coating.

In electrodeposition coating, the coating composition can be applied not only to various electroconductive supports, particularly metals such as steel, aluminum, copper, magnesium, etc., but also to metallized plastics, electroconductive carbon coatings, etc.

The micro-resin particles (II) of internally crosslinked polymers used in the present invention are produced from a compound (A) having at least two active hydrogens per molecule and a compound (B) having at least two active double bonds per molecule. The particle size of the micro-resin particles (II) is preferably 0.05 to 3μ. Particles sizes exceeding 3μ are not preferred because a stable water dispersion is not obtained, and also because defects appear in the baked coating film. When the particle size is less than 0.05μ, it is difficult to control the flow on the edge portions of the coated article at the time of baking so that sufficient edge-corrosion resistance is not obtained. Further, it is necessary for at least one of these two compounds, A and B, to contain amino groups in an amount of 0.3 to 3.0 milligram equivalents per gram of the internally crosslinked polymer because the micro-resin particles produced from these compounds must be given a cationic property in order to stably disperse the micro-resin particles in water. This amino group may be contained in either all or one of these compounds.

As described above, the compound (A) contains at least two active hydrogens per molecule, and this active hydrogen refers to one contained in a primary or secondary amino group, a thiol group or an active methylene group. This compound (A) includes compounds containing two or more of the foregoing groups per molecule and further includes the commonly known paint resins, such as polyepoxy resins, acrylic resins, polybutadiene resins, polyester resins, polyurethane resins, polyamide resins, etc. of which have been modified to contain two or more molecules of a compound containing at least one of the foregoing active hydrogen containing groups per molecule, or one or more molecules of a compound containing two or more of the foregoing active hydrogen containing groups per molecule.

As described above, the compound (B) contains at least two active double bonds per molecule, and this active double bond refers to an $\alpha,\beta$-ethylenic double bond adjacent to a carbonyl group. This compound (B) includes compounds containing two or more of the foregoing double bonds per molecule, and further includes the commonly known paint resins set forth above which have been modified to contain two or more molecules of a compound containing one double bond per molecule or one or more molecules of a compound containing two or more double bonds per molecule.

Modification referred to herein is to bond the foregoing compounds to the resins by the commonly known reactions described below. At this time, it is necessary that at least two active hydrogens or active double bonds remain in one molecule of the composition after modification.

Examples of the reaction of the foregoing compounds with the resins will be shown below:

(a) Reaction of an amine compound having one or more primary amino and secondary amino groups in the molecule with epoxy groups in the resin.

(b) Amidation reaction of the above amine compound with carboxyl groups in a polyester resin.

(c) Urethane reaction or biuret reaction of the above amine compound and/or an amine compound having one or more primary amino or secondary amino groups and one or more hydroxyl groups in the molecule with isocyanate groups in the resin.

(d) Method comprising reacting an epoxy group with a ketimine compound derived from a ketone and an amine having one or more secondary amines and at least one primary amino group in the molecule, and hydrolyzing the resulting product to separate the ketone, whereby the primary amino group is regenerated [refer to Japanese Patent Kokai (Laid-open) No. 129270/1984].

(e) Reaction of mercapto groups in a polymercapto compound with epoxy groups in the resin.

(f) Esterification and ester-exchange reaction of hydroxyl groups in the foregoing resin with the foregoing active methylene group-containing compound [refer to Japanese Patent Kokai (Laid-open) No. 83568/1982].

(g) Esterification or ester-exchange reaction of the foregoing active double bond-containing compound with hydroxyl groups in the foregoing resin, or etherification of said active double bond-containing compound with epoxy groups in the foregoing resin [refer to Japanese Patent Koaki (Laid-open) No. 83568/1982].

In introducing an amino group in order to impart a cationic property to the micro-resin particles (II), when the active hydrogen in the compound (A) has its origin in an amino group of the compound (A), this amino group gives the cationic property. In cases other than the one described above, the cationic property is obtained by bonding an amino group-containing compound to the compounds (A) and/or (B) by any of the known chemical reactions so that these active hydrogen and active double bond are not lost by the reaction.

As the compound containing a primary or secondary amino group, there are mentioned primary alkylamines (e.g. monomethylamine, monoethylamine, monobutylamine, monopropylamine), primary alkanolamines (e.g. monoethanolamine, monopropanolamine, monobutanolamine), secondary alkylamines (e.g. dimethylamine, diethylamine, dibutylamine), secondary alkylalkanolamines (e.g. diethanolamine, dipropanolamine, methylethanolamine, ethylethanolamine, methylpropanolamine), diamines having one primary amino group and one secondary amino group in the molecule (e.g. monomethylaminoethylamine, monoethylaminoethylamine, monomethylaminopropylamine, monoethylaminopropylamine), primary diamines (e.g. ethylenediamine, 1,4-butanediamine, 1,6-hexanediamine, phenylenediamine, piperazine), polyamines (e.g. diethylenetriamine, triethylenetetramine, tetraethylenepentamine, pentaethylenehexamine), polyamidepolyamines which are a condensation product of the foregoing di- or polyamine with an organic dicarboxylic acid (e.g. adipic acid, azelaic acid, maleic acid) and ketimine compounds obtained by the reaction of a polyamine having one secondary amino group and one or more primary amino groups in the molecule with a ketone, said polyamine including monomethylaminoethylamine, monoethylaminopropylamine, diethylenetriamine, dibutylenetriamine, etc. belonging to the foregoing amine compounds, and said ketone including methyl ethyl ketone, methyl isobutyl ketone, cyclohexanone, etc.

As the foregoing compound containing a thiol group, there are mentioned for example those which are produced by reacting a glycol, polyesterpolyol, polyetherpolyol or polyamine with a monomercaptomonocarboxylic acid or a lower alkyl ester thereof represented by the formula, R'OOC—R—SH (in which R represents a divalent organic residue, such as a $C_1$-$C_{20}$ alkylene which may be substituted, and R' represents a $C_1$-$C_4$ alkyl group such as methyl and ethyl).

Examples of polyesterpolyol include for example polymerized polyesters obtained by reacting ethylene glycol, propylene glycol, neopentyl glycol or cyclohexanedimethanol with an organic dicarboxylic acid (e.g. terephthalic acid, hexahydrophthalic acid, adipic acid, azelaic acid) or its anhydride.

Examples of polyesterpolyol include for example poly(oxytetramethylene)glycol, poly(oxyethylene)glycol, poly(oxypropylene)glycol, etc.

Examples of polyamines include for example the foregoing di- or polyamines and polyamidepolyamines, etc.

Examples of the monomercaptomonocarboxylic acids include mercaptoacetic acid, 2-mercaptopropionic acid, 3-mercaptopropionic acid, etc.

As examples of the foregoing active methylene group-containing compounds, there are mentioned for example malonic acid, monomethyl malonate, monoethyl malonate, monobutyl malonate, dimethyl malonate, diethyl malonate, succinic acid, monoethyl succinate, dibutyl succinate, cyanoacetamide, cyanoacetic acid, ethyl cyanoacetate, methyl acetoacetate, ethyl acetoacetate, butyl acetoacetate, etc.

As examples of the $\alpha,\beta$-ethylenic unsaturated carbonyl compounds used in the present invention, there are mentioned for example acrylic acid, methacrylic acid, crotonic acid, maleic acid, itaconic acid, cinnamic acid and ester compounds of these acids with methanol, ethanol, propanol, butanol, allyl alcohol, ethylene glycol, propylene glycol, trimethylolpropane, pentaerythritol, phenol, 4,4-diphenolpropane, etc. Production of internally-crosslinked spherical micro-resin particles:

The internally-crosslinked polymers used to form the micro-resin particles (II) of the present invention are obtained by mixing the active hydrogen-containing compound (A), the active double bond-containing compound (B) and, if necessary, a solvent (e.g. water, alcohol, ester, ether, ketone), and an organic acid (e.g. formic acid, acetic acid, lactic acid, propionic acid), thoroughly mixing the resulting mixture at a temperature of room temperature to 150° C. with stirring, adding water or an aqueous solution of the above organic acid or a water dispersion of a cationically electrodepositable aqueous resin (I) which is an essential component to the present invention, and then stirring the resulting mixture at a temperature of room temperature to 95° C to carry out addition polymerization. When the compounds (A) and (B) are kept for a long time in a state wherein they are mixed and heated, addition polymerization naturally takes place to the full to produce gelled products. Consequently, at a point when the addition polymerization has not yet begun at all or has only partly begun, water or an aqueous solution of the organic acid, or a water dispersion of a cationically electrodepositable aqueous resin, is added to disperse the compounds (A) and (B) in fine particles, and then the addition polymerization is allowed to proceed to the full to produce internally-crosslinked micro-resin particles (II).

In the present, invention, the internally-crosslinked micro-resin particles (II) are added in an amount of preferably 0.1 to 40 parts by weight based on 100 parts by weight of the solid matter of the foregoing cationically electrodepositable water-dispersible resin (I). When the amount is less than 0.1 part by weight, satisfactory edge-corrosion preventive performance is not obtained. When the amount exceeds 40 parts by weight, the micro-resin particles, because of their crosslinked structure, do not melt by joule heat during electrodeposition coating, so that electrical resistance of film referred to in this field is not uniformly obtained. The coating film obtained, therefore, has many defects and is non-uniform in quality, and also a sufficient throwing powder is not obtained.

The present invention will be illustrated in more detail with reference to the following specific examples, but it is not limited thereto. Unless otherwise stated, all the parts and percents (%) in the examples are by weight.

PRODUCTION EXAMPLES FOR ACTIVE HYDROGEN-CONTAINING COMPOUND (A)

Production Example 1

To a 3-liter four-necked flask equipped with a thermometer, a reflux condenser and a stirrer were added 950 parts of a bisphenol A-type epoxy resin, having an epoxy equivalent of 475, and 588 parts of propylene glycol methyl ether, and the mixture was heated to 110° C. with stirring and dissolved. After cooling the mixture to 80° C., 422 parts of a diketimine compound, 1 prepared from 2 moles of methyl ethyl ketone and 1 mole of diethylenetriamine, was added. After keeping the mixture at a temperature of 80° C. for 2 hours, 12 parts of acetic acid and 180 parts of pure water were added, and reaction was carried out at a temperature of 80° C. for 1 hour to obtain Compound A-1 containing two primary amino groups per molecule.

Production Example 2

To the same 3-liter for-necked flask as used in Production example 1 was added 1100 parts of a methyl ethyl ketone solution of an acrylpolyol resin, having a number average molecular weight of 2200, and comprising methyl methacrylate and 2-hydroxyethyl methacrylate in a weight ratio of 1:1, and then stirring was started. In said solution, the solid resin content was 75% and the hydroxyl equivalent was 216 mg KOH per gram of the solid resin. Subsequently, 452 parts of malonic acid monoester and 3 parts of dimethylbenzylamine were added, and reaction was carried out at a temperature of 165° C. for 3 hours to obtain Compound A-2 having an acid value of 25.

Production Example 3

To the same 3-liter four-necked flask as used in Production example 1 were added 950 parts of a bisphenol F-type epoxy resin, having an epoxy equivalent of 950, and 407 parts of ethylene glycol butyl ether, and the mixture was dissolved at a temperature of 110° C. with stirring. After cooling the mixture to 60° C., 105 parts of diethanolamine was added, and reaction was carried out at a temperature of 120° C. for 2 hours. Thereafter, 462 parts of mercaptobenzoic acid was added, and reaction was carried out at a temperature of 170° C. for 5 hours to obtain Compound A-3 having an acid value of 1.5.

Production Example 4

To the same 3-liter four-necked flask as used in Production example 1 were added 1100 parts of a polyesterpolyol resin having a hydroxyl value of 215 mg KOH/g (Nippolan 1100; a product of Nippon Polyuret Co., Ltd.) and 472 parts of methyl isobutyl ketone, and the mixture was dissolved at a temperature of 70° C. with stirring.

Separately from this, 340 parts of methyl isobutyl ketone and 348 parts of 2,4-tolylenediisocyanate were added to a similar 2-liter four-necked flask, and 376 parts of a methyl isobutyl ketone solution (solid content, 91.5%) of a ketimine compound prepared from 1 mole of monomethylaminopropylamine and 1 mole of methyl isobutyl ketone was added dropwise at a temperature of 25° to 30° C. over 60 minutes with stirring to prepare a semi-blocked isocyanate compound. This compound was gradually added to the above polyesterpolyol resin solution, and reaction was carried out at a temperature of 70° C. for 3 hours to obtain Compound A-4.

PRODUCTION EXAMPLES FOR ACTIVE DOUBLE BOND-CONTAINING COMPOUND (B)

Production Example 5

To the same 3-liter four-necked flask as used in Production example 1 were added 1000 parts of an epoxidized polybutadiene resin having an oxirane oxygen content of 6.5% and a number average molecular weight of 1800 (E-1800-6.5; a product of Nisseki Kagaku Co., Ltd.), 377 parts of ethylene glycol butyl ether and 131 parts of methylethanolamine, and reaction was carried out at a temperature of 170° C. for 6 hours in a nitrogen gas stream. After cooling the reaction solution to 120° C., 81.4 parts of acrylic acid, 8.8 parts of hydroquinone and 27.1 parts of ethylene glycol ethyl ether were added, and reaction was carried out at a temperature of 120° C. for 4 hours to obtain an active double bond-containing compound B-1.

Production Example 6

To a 1-liter four-necked flask similar to that used in Production example 1 were added 196 parts of maleic acid anhydride and 232 parts of 2-hydroxyethyl acrylate, and then 0.9 part of triethylamine was added at a temperature of 65° C. Reaction was carried out at the same temperature for 1 hour to prepare a compound having an acid value of 260 mg KOH/g.

To an another 3-liter four-necked flask were added 1200 parts of a novolak-type epoxy resin having an epoxy equivalent of 180, 514 parts of ethylene glycol butyl ether and 490 parts of diethanolamine, and reaction was carried out at a temperature of 90° C. for 1.5 hours. Thereafter, 428 parts of the above compound Prepared from maleic acid anhydride and 2-hydroxyethyl acrylate and 2 parts of hydroquinone were added, and reaction was carried out at a temperature of 120° C. for 3 hours to obtain Compound B-2 having an acid value of 0.5.

Production Example 7

514 Parts of toluene was added to the same 3-liter four-necked flask as used in Production example 1 and refluxed at a temperature of about 110° C. Separately from this, 200 parts of n-butyl acrylate, 400 parts of methyl methacrylate, 400 parts of 2-hydroxyethyl methacrylate and 50 parts of di-tert-butyl peroxide were added to an another flask and mixed with stirring. The resulting mixture was added dropwise to the above flask over 3 hours under reflux of toluene. Thereafter, reaction was continued at a temperature of 115° C. for 2 hours, followed by cooling to 80° C.

Subsequently, 294 parts of maleic acid anhydride and 10 parts of tributylamine were added, and reaction was carried out at a temperature of 100° C. for 4 hours to obtain a reaction product having an acid value of 130 mg KOH/g. Thereafter, 426 parts of glycidyl methacrylate was added and reaction was carried out at a temperature of 120° C. for 4 hours to obtain Compound B-3 having an acid value of 3.5 mg KOH/g.

PRODUCTION EXAMPLES FOR INNER-CROSSLINKED MICRO-RESIN PARTICLES

Production Example 8

To the same 3-liter four-necked flask as used in Production example 1 were added 1067 parts of Compound B-1, 300 parts of a modified aliphatic polyamine having an amine value of 345 mg KOH/g (Adeka Hardener EH-266; a product of Asahi Denka Co., Ltd.) and 325 parts of isopropanolamine, and the contents of the flask were mixed at a temperature of 60° C. for 30 minutes with stirring.

During this period, 2500parts of pure water and 15 parts of acetic acid were added to a 4-liter stainless steel cylindrical container and kept at a temperature of 60° C. while stirring with a disper. To this aqueous acetic acid solution was gradually added 621 parts of the above resin mixture over 20 minutes. Thereafter, stirring was continued at a temperature of 60° C. for 3 hours to obtain a water dispersion H of inner-crosslinked micro-resin particles.

The solid content of this water dispersion was 20%, and the base value was 1.7 mg equivalent/g. On measuring the particle size on a particle size-measuring instrument (LP 3000/ 3100; a product of Otsuka Denshi Co., Ltd.) according to the laser scattering method, the particle size was 0.1 $\mu$. The content of insoluble matter of the water dispersion was measured by adding THF to the dispersion and centrifuging, and as a result, the content was found to be 95% of the total solid content (hereinafter referred to as gel ratio).

Production Example 9

To the same 3-liter four-necked flask as used in Production example 1 were added 1428 parts of Compound A-1, 666 parts of Compound B-1 and 406 parts of ethylene glycol butyl ether, and the contents of the flask were mixed at a temperature of 50° C. for 1 hour, after which 13.8 parts of formic acid was added. After mixing for 10 minutes, 833 parts of the resulting resin mixture was gradually added to 2500 parts of pure water over 20 minutes in the same manner as in Production example 8, and stirring was continued at a temperature of 60° C. for 3 hours to obtain a water dispersion I of inner-crosslinked micro-resin particles. The solid content of the water dispersion was 20%, the base value was 2.9 mg equivalent/g, the particle size was 0.3$\mu$, and the gel ratio was 88%.

Production Example 10

To a 5-liter four-necked flask similar to that used in Production example 1 were added 400 parts of Compound A-2, 500 parts of Compound B-2, 330 parts of ethylene glycol ethyl ether and 19.2 parts of acetic acid, and the contents of the flask were mixed at a temperature of 60° C. for 2 hours with stirring. Thereafter, 1950 parts of pure water was gradually added, and stirring was continued at a temperature of 80° C. for 3 hours to obtain a water dispersion J of inner-crosslinked micro-resin particles having a particle size of 0.2μ. The solid content of this water dispersion was 25%, the gel ratio thereof was 80%, and the base value was 1.0 mg equivalent/g.

Production Example 11

To the same 3-liter four-necked flask as used in Production example 1 were added 1265 parts of Compound A-3, 667 parts of Compound B-3, 568 parts of isopropanol and 19.3 parts of formic acid, and the contents of the flask were mixed at a temperature of 80° C. for 1 hour with stirring. Thereafter, in the same manner as in Production example 8, 840 parts of the resulting resin mixture was added over 20 minutes to 2500 parts of pure water kept at a temperature of 60° C. in a 4-liter stainless steel container, and the mixture was kept at the same temperature for 3 hours to obtain a water dispersion K of inner-crosslinked micro-resin particles. The solid content of the water dispersion was 20%, the particle size was 1.1μ, and the base value was 0.4 mg equivalent/g. The gel ratio of the water dispersion was 85%.

Production Example 12

To a 5-liter four-necked flask similar to that used in Production example 1 were added 1470 parts of Compound A-4, 102 parts of trimethylolpropane triacrylate and 123 parts of ethylene glycol ethyl ether, and the contents of the flask were mixed at a temperature of 50° C. for 1 hour with stirring. Thereafter, a mixture of 2673 parts of pure water and 40 parts of lactic acid was gradually added over 30 minutes, after which stirring was continued at a temperature of 70° C. for 4 hours to obtain a water dispersion L of inner-crosslinked micro-resin particles. The solid content of the water dispersion was 25%, the particle size was 0.8μ, and the base value was 2.2 mg equivalent/g. The gel ratio of the water dispersion was 98%.

Production example 13

To the same 3-liter four-necked flask as used in Production example 1 were added 1250 parts of Compound B-2 and 100 parts of trimethylolpropane trimercaptopropionate, and the contents of the flask were mixed at a temperature of 80° C. for 2 hours. Thereafter, 614 parts of the resulting resin mixture was gradually added over 20 minutes to a mixture, kept at a temperature of 70° C., of 1877 parts of pure water and 9 parts of acetic acid. Stirring was then continued at a temperature of 60° C. for 3 hours to obtain a water dispersion M of inner-crosslinked micro-resin particles. The solid content of the water dispersion was 20%, the particle size was 0.5μ, and the base value was 2.0 mg equivalent/g. The gel ratio of the water dispersion was 90%.

Production example 14

To the same 3-liter four-necked flask as used in Production example 1 were added 1333 parts of Compound B-3 and 259 parts of ethylene glycol butyl ether, and 100 parts of triethylenetetramine was added at a temperature of 60° C. with stirring. Stirring was then continued at a temperature of 60° C. for further 30 minutes. In the same manner as in Production example 8, 769 parts of the resulting resin mixture was added over 15 minutes to a mixture, kept at a temperature of 55° C., of 1718 parts of pure water and 12.6 parts of formic acid, and stirring was continued at a temperature of 35° C. for 3 hours to obtain a water dispersion N of inner-crosslinked micro-resin particles. The solid content of the water dispersion was 18%, the particle size was 1.7μ, and the base value was 2.5 mg equivalent/g. The gel ratio of the water dispersion was 93%.

PRODUCTION EXAMPLES FOR CATIONIC AQUEOUS RESIN AND ITS WATER DISPERSION

Production Example 15

1900 Grams of Epikote #1004 (epibis-epoxy resin; a product of Shell Co.) was dissolved in 700 g of ethylene glycol ethyl ether in a clean 4-liter four-necked flask. After adding 200 g of diethanolamine, the resulting mixture was kept at a temperature of 60° C. to 65° C. for 1 hour, heated to 120° C. and then kept at the same temperature for 1 hour. Subsequently, after cooling the mixture to 80° C., 500 g of a blocked isocyanate-type curing agent (EH-117-20; a product of Asahi Denka Co., Ltd.) was added. The resulting mixture was thoroughly mixed while keeping it at a temperature of 80° C. to 85° C. for 1 hour to obtain a cationic aqueous resin. Thereafter, 45 g of the above resin, 45 g of ethylene glycol ethyl ether, 135 g of titanium oxide, 7 g of carbon black and 300 g of glass beads were put in a 1-liter mayonnaise bottole and finely pulverized on a quick mill to obtain a pigment dispersion. 540 Grams of the above aqueous resin, 232 g of the pigment dispersion and 8.5 g of formic acid were added to a 4-liter stainless steel vat and thoroughly mixed together with 2179.5 g of deionized water while gradually adding the deionized water and stirring with a disper. Thus, a cationic water dispersion 0 having a solid content of 20% was obtained.

Production Example 16

45 Grams of the above cationic aqueous resin, 45 g of ethyl cellosolve, 120 g of titanium oxide, 7 g of carbon black, 35 g of basic lead silicate and 300 g of glass beads were put in a 1-liter mayonnaise bottle and finely pulverized on a quick mill to obtain a pigment dispersion.

Thereafter, 540 g of the above cationic resin, 252 g of the pigment dispersion and 8.5 g of formic acid were added to a 4-liter stainless steel vat and thoroughly mixed together with 2259.5 g of deionized water while gradually adding the deionized water and stirring with a disper. Thus, a cationic water dispersion P having a solid content of 20% was obtained. Examples 1 to 9 and Comparative examples 1 and 2

The inner-crosslinked micro-resin particles H to N and the water dispersions O and P of the cationic aqueous resin were mixed in the prescribed proportions to prepare cationic electrodeposition paints. Dull steel plate treated with zinc phosphate and the edge of a cutter knife (a product of Co.) were subjected to cationic electrodeposition coating. The appearance and the results of the salt spray test are shown in Table 1.

TABLE 1

|  | No. | Example 1 | 2 | 3 | 4 | 5 | 6 | 7 | 8 | 9 | Comparative example 1 | 2 |
|---|---|---|---|---|---|---|---|---|---|---|---|---|
| Cationic eletrodeposition paint |  | O | O | O | O | O | P | P | P | P | O | P |
| Water dispersion of inner-crosslinked micro-resin particles |  | H | H | H | I | J | K | L | M | N | None | None |
| Amount added (%) *1 |  | 1 | 2 | 5 | 3 | 3 | 3 | 3 | 3 | 3 | — | — |
| Baking condition |  | 170° C., 20 min | | | | | | | | | | |
| Film thickness (μ) |  | 20 | 20 | 20 | 20 | 20 | 20 | 20 | 20 | 20 | 20 | 20 |
| Film appearance |  | Good | Good | Good | Good | Good | Good | Good | Good | Good | Good | Good |
| Salt spray resistance *2 |  | 2.5 | 2.3 | 2.6 | 2.5 | 2.5 | 2.8 | 2.8 | 2.4 | 2.5 | 2.8 | 2.7 |
| Edge-corrosion resistance *3 |  | 5 | 3 | 0 | 0 | 2 | 1 | 1 | 0 | 3 | 200 | 180 |

Note:
*1 Weight ratio (%) of the solid content of micro-resin particle to that of cationic electrodeposition paint.
*2 The flat portion of the test plate is cross-cut and salt spray-tested for 960 hours according to JIS Z 2371, and the width (mm) of rust formed from the cut portion is measured.
*3 The edge of the foregoing cutter knife is coated so that the film thickness on the flat portion is 20μ, and baked as determined to make a test plate. The knife is set in a salt spray tester so that the edge turns up and salt spray-tested for 168 hours according to JIS Z 2371, and the number of rusts at the edge portion is counted.

According to the present invention, cationic electrodeposition films having excellent edge-corrosion resistance are obtained with the same good appearance and corrosion resistance as ever being maintained.

What is claimed is:

1. In a composition suitable for use as a cationic electrodeposition coating which contains an aqueous dispersion of a cationic aqueous resin I; the improvement, whereby increasing the edge coating capability of said coating upon cationic electrodeposition, which comprises including in said composition micro-resin particles II, comprising an internally crosslinked addition polymer reaction product: of an active hydrogen-containing polymer compound having at least two active hydrogens per molecule (A) and an active double bond-containing polymer compound having at least two active double bonds per molecule (B), which reaction product contains 0.3 to 3 mg equivalents of pendant cationic groups per gram and which resin particles (II) are chemically different from said cationic aqueous resin (I).

2. The improved composition according to claim 1 wherein the compounds (B) has at least two active ethylenic double bonds per molecule, which double bond is adjacent to a carbonyl group.

3. The improved composition according to claim 1 wherein the cationic groups contained in the microresin particles are amino groups contained in at least one of compound (A) and (B), said amino groups being contained in an amount of 0.3–3 milligrams equivalent per 1 gram.

4. The improved composition as claimed in claim 1, wherein said micro-resin particles are about 0.05 to 3μ in size.

5. The improved composition as claimed in claim 1, wherein said micro-resin particles comprise about 0.1 to 40 parts by weight per 100 parts by weight of solid matter in said composition.

6. The improved composition as claimed in claim 1 wherein the cationic aqueous resin (I) is an amino-modified epoxy resin; and the microresin particles (II) are a reaction product of (A) a compound having at least two active hydrogen atoms contained in primary or secondary amino groups, thiol groups or active methylene groups and (B) a compound having at least two α, β-ethylenic double bonds adjacent to carbonyl groups, which micro-resin particles have a diameter of 0.05–3μ.

7. In a composition suitable for use as a cationic electrodeposition coating which contains an aqueous dispersion of a cationic aqueous resin (I); the improvement, whereby increasing the edge coating capability of said coating upon electrodeposition, which comprises including in said composition about 0.1 to 40 parts by weight, per 100 parts by weight of cationic aqueous resin (I), of micro-resin particles (II) of about 0.05 to 3μ in size, which micro-resin particles comprise an internally cross-linked addition polymer reaction product of: an active hydrogen-containing polymer having at least two active hydrogens per molecule (A), and an active double bond-containing polymer having at least two active double bonds per molecule (B), which reaction product contains about 0.3 to 3 milligram equivalents of amine groups per gram, and which resin particles (II) are chemically different from said cationic resin (I).

* * * * *